(12) United States Patent
Potter

(10) Patent No.: US 10,010,780 B2
(45) Date of Patent: Jul. 3, 2018

(54) HEAD ENGAGING ASSEMBLY FOR GOLF SWING TRAINING DEVICE

(71) Applicant: Kerry Potter, Scottsdale, AZ (US)

(72) Inventor: Kerry Potter, Scottsdale, AZ (US)

( * ) Notice: Subject to any disclaimer, the term of this patent is extended or adjusted under 35 U.S.C. 154(b) by 0 days.

(21) Appl. No.: 15/786,231

(22) Filed: Oct. 17, 2017

(65) Prior Publication Data

US 2018/0099202 A1 Apr. 12, 2018

Related U.S. Application Data

(63) Continuation-in-part of application No. 15/285,620, filed on Oct. 5, 2016, now Pat. No. 9,808,700.

(51) Int. Cl.
*A63B 69/36* (2006.01)
*G09B 19/00* (2006.01)

(52) U.S. Cl.
CPC ...... *A63B 69/3608* (2013.01); *G09B 19/0038* (2013.01); *A63B 2210/58* (2013.01); *A63B 2225/093* (2013.01)

(58) Field of Classification Search
CPC ............ A63B 69/3608; A63B 2210/58; A63B 2225/093; G09B 19/0038
See application file for complete search history.

(56) References Cited

U.S. PATENT DOCUMENTS

| 2,626,151 | A | * | 1/1953 | Troutman | ........ A63B 21/00181 346/8 |
| 2,690,911 | A | * | 10/1954 | Newgren | ........... A63B 69/3608 473/271 |
| 3,408,078 | A | * | 10/1968 | Falerni | ............... A63B 69/0059 473/208 |
| 3,698,721 | A | * | 10/1972 | Stewart | .............. A63B 69/3641 473/264 |
| 3,712,625 | A | * | 1/1973 | Taylor | ................ A63B 69/0057 473/274 |
| 4,513,972 | A | * | 4/1985 | Empie | ................ A63B 69/3608 473/274 |
| 5,439,226 | A | * | 8/1995 | Luedtke | ............. A63B 69/3608 473/211 |
| 5,577,729 | A | * | 11/1996 | Sabour | ............... A63B 69/3608 473/274 |
| 7,204,766 | B1 | * | 4/2007 | Rose | .................. A63B 69/0059 473/266 |

(Continued)

*Primary Examiner* — Michael Dennis
(74) *Attorney, Agent, or Firm* — Parsons & Goltry; Robert A. Parsons; Michael W. Goltry

(57) ABSTRACT

A modular head engaging assembly for use with a golf swing training device, the assembly including a U-shaped back-of-the-head positioning element including axially aligned inner and outer coupling pieces, the U-shaped back-of-the-head positioning element extending from a position adjacent the forehead of a golfer across the top of the head to a position overlying a portion of the rear of the head, a U-shaped collar element including axially aligned inner and outer coupling pieces, the U-shaped collar element being extending from a position adjacent the forehead of the golfer around each side of the head with a free end positioned above each of the ears, and a front head-positioning element including an inner coupling piece, the front head-positioning element being positioned adjacent the forehead. The three elements being coupled by the coupling pieces.

17 Claims, 12 Drawing Sheets

(56) References Cited

U.S. PATENT DOCUMENTS

| | | | |
|---|---|---|---|
| 7,572,192 B1* | 8/2009 | Boyd | A63B 69/0059 473/208 |
| 8,308,580 B2* | 11/2012 | Jasinski | A63B 69/0057 473/257 |
| 2015/0265899 A1* | 9/2015 | Bell | A63B 69/3623 473/209 |

* cited by examiner

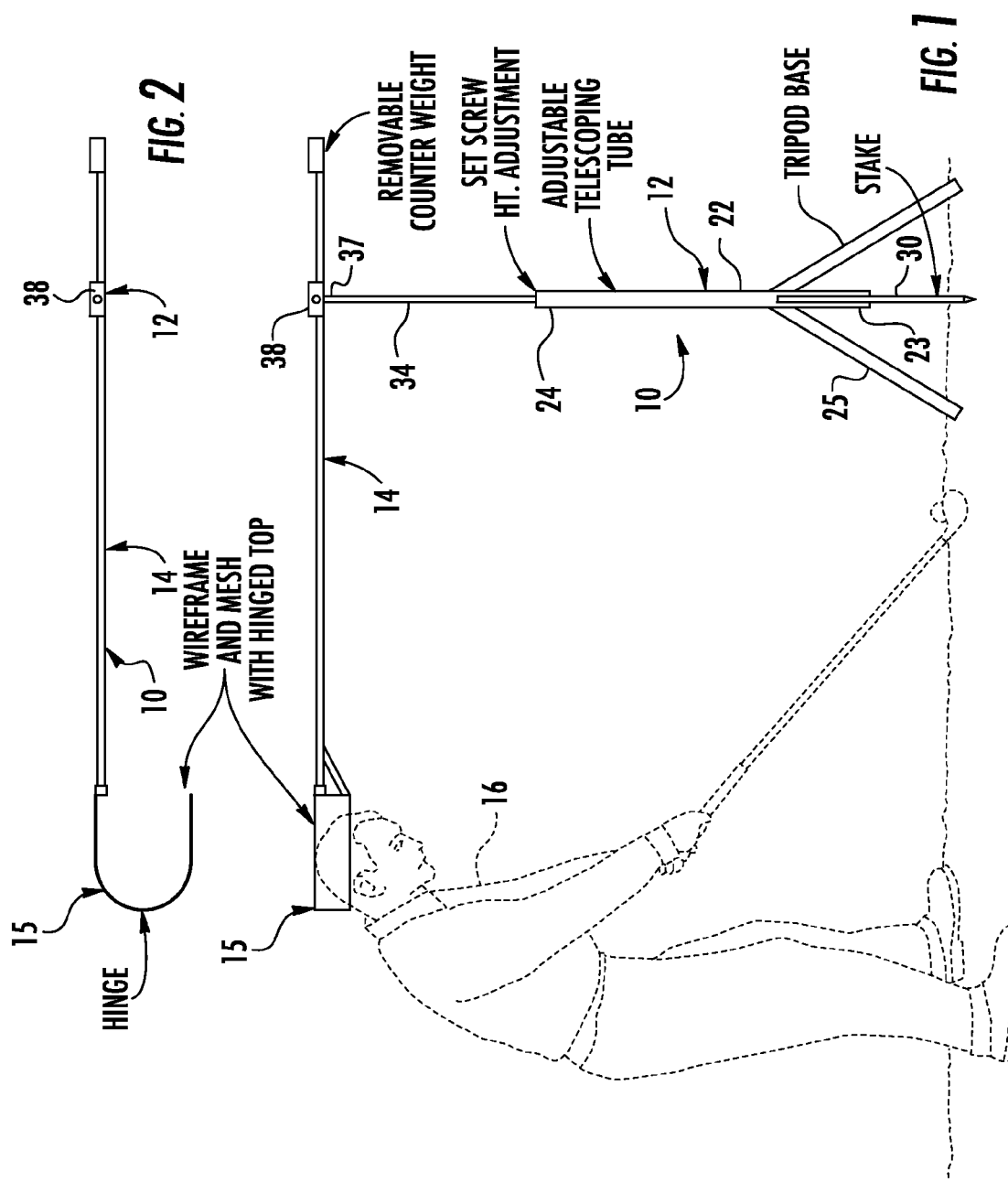

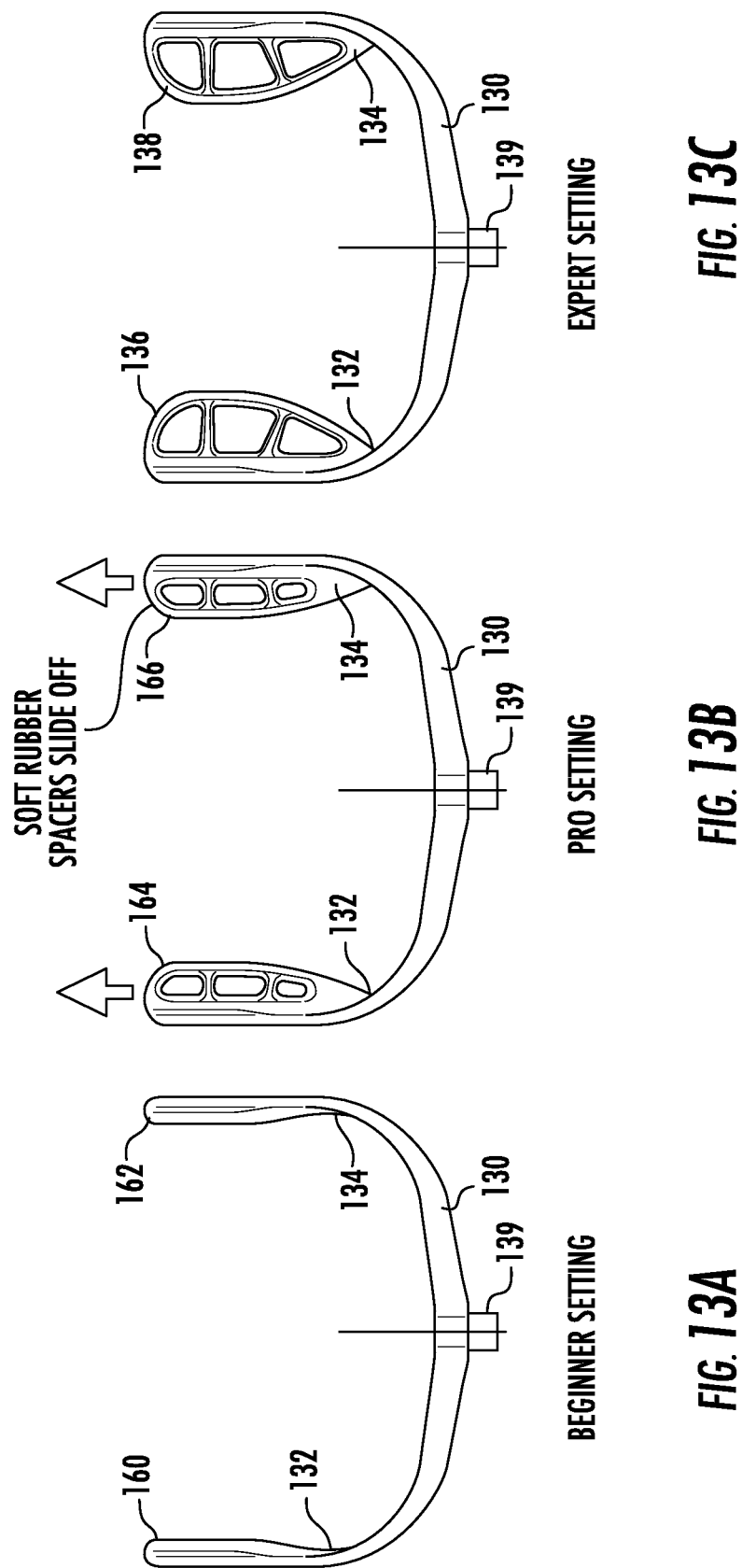

HEAD ENGAGING ASSEMBLY FOR GOLF SWING TRAINING DEVICE

CROSS-REFERENCE TO RELATED APPLICATION

This application is a continuation-in-part of U.S. patent application Ser. No. 15/285,620, filed Oct. 5, 2016.

FIELD OF THE INVENTION

This invention relates to an improved head engaging assembly for use with golf swing training devices.

BACKGROUND OF THE INVENTION

In golf, positioning of the head during a swing can be of great importance to successfully contacting the golf ball. To this end, many and diverse devices have been developed in an attempt to stabilize, position or otherwise constrain a golfer's head during the swing. By stabilizing a golfer's head during a swing, extraneous movement of the shoulders is reduced, keeping the arms, and thus the club, "on plane". The many devices developed, prevent or indicate lateral movement of the head, and also prevent or indicate movement of the head vertically. The theory is that by keeping the golfer's head motionless, the shoulders will be more likely to follow the correct path by turning rather than swaying or other undesirable movement. While many devices are successful in their intent, stabilization of the golfer's head can be carried to a point at which it becomes detrimental to the swing. After the proper shoulder turn and the club has come through the ball, it is often desirable for the motion of the golfer's body to progress forwardly. This "step through" motion can be slight or accentuated depending on the swing. In either case, head positioning and constraining devices can interfere with this follow through of a golf swing.

The present invention modifies the head engaging assembly in the parent case to make it more useable, i.e. to be more adaptable to a golfer's head, so as to improve head positioning and restraint with improved comfort and safety during use.

It would be highly advantageous, therefore, to remedy the foregoing and other deficiencies inherent in the prior art.

An object of the present invention is to provide an improved head engaging assembly for use with a golf swing training device which positions and restrains the golfer's head.

Another object of the present invention is to provide an improved head engaging assembly for use with a golf swing training device which will release the golfer's head for the follow through motion of a proper golf swing.

Yet another object of the present invention is to provide an improved head engaging assembly for use with a golf swing training device which is light weight and easily attached to the device.

SUMMARY OF THE INVENTION

Briefly, to achieve the desired objects and advantages of the instant invention, provided is a modular head engaging assembly for use with a golf swing training device having a horizontal arm coupled to a vertical support assembly, the horizontal arm having an outer tubular coupling piece attached thereto. The modular head engaging assembly includes a U-shaped back-of-the-head positioning element, a U-shaped collar element, and a front padded head-positioning element. Each of the U-shaped back-of-the-head positioning element and the U-shaped collar element include axially aligned inner and outer tubular coupling pieces. The U-shaped back-of-the-head positioning element is designed to extend from a position adjacent the forehead of a golfer across the top of the head to a position overlying a portion of the rear of the head of the golfer. The U-shaped collar element is designed to extend from a position adjacent the forehead of the golfer around each side of the head with a free end positioned above each of the ears of the golfer. The modular head engaging assembly also includes a front padded head-positioning element including an inner tubular coupling piece and designed to be positioned adjacent the forehead of the golfer. One of the inner tubular coupling piece of the U-shaped back-of-the-head positioning element is removably engaged in the outer tubular coupling piece of the horizontal arm and the inner tubular coupling element of the U-shaped collar element is removably engaged in the outer tubular coupling piece of the U-shaped back-of-the-head positioning element or the inner tubular coupling piece of the U-shaped collar element is removably engaged in the outer tubular coupling piece of the horizontal arm and the inner tubular coupling element of the U-shaped back-of-the-head positioning element is removably engaged in the outer tubular coupling piece of the U-shaped collar element. The inner tubular coupling piece of the front padded head-positioning element is removably engaged in the outer tubular coupling piece of the U-shaped collar element or in the outer tubular coupling piece of the U-shaped back-of-the-head positioning element, respectively.

In a more specific aspect, a modular head engaging assembly is disclosed for use with a golf swing training device having a horizontal arm coupled to a vertical support assembly, the horizontal arm having an outer tubular coupling piece attached thereto. The modular head engaging assembly includes a U-shaped back-of-the-head positioning element, a U-shaped collar element, and a front padded head-positioning element. Both the U-shaped back-of-the-head positioning element and the U-shaped collar element include axially aligned inner and outer tubular coupling pieces. The U-shaped back-of-the-head positioning element is designed to extend from a position adjacent the forehead of a golfer across the top of the head to a position overlying a portion of the rear of the head of the golfer. The U-shaped collar element is designed to extend from a position adjacent the forehead of the golfer around each side of the head with a free end positioned above each of the ears of the golfer. The front padded head-positioning element includes an inner tubular coupling piece and is designed to be positioned adjacent the forehead of the golfer. One of the inner tubular coupling piece of the U-shaped back-of-the-head positioning element is removably engaged in the outer tubular coupling piece of the horizontal arm and the inner tubular coupling element of the U-shaped collar element is removably engaged in the outer tubular coupling piece of the U-shaped back-of-the-head positioning element or the inner tubular coupling piece of the U-shaped collar element is removably engaged in the outer tubular coupling piece of the horizontal arm and the inner tubular coupling element of the U-shaped back-of-the-head positioning element is removably engaged in the outer tubular coupling piece of the U-shaped collar element. The inner tubular coupling piece of the front padded head-positioning element is removably engaged in the outer tubular coupling piece of the U-shaped collar element or in the outer tubular coupling piece of the U-shaped back-of-the-head positioning element, respectively. A resilient spacer is affixed to each free end of the U-shaped collar element with at least a portion of the resilient spacers positioned between the free ends and the golfer's head. One of the free ends of the U-shaped collar element is hingedly connected by a spring-loaded hinge to the U-shaped collar element so as to allow outward movement of the one free end away from the head of the golfer and the spring-loaded hinge biases the one of the free ends into a closed position.

Briefly, to achieve the desired objects and advantages of the instant invention, provided is a golf swing training device including a vertical support assembly, a horizontal arm coupled to the vertical support assembly, and a head engaging assembly carried by the horizontal arm. The head engaging assembly includes a U-shaped back-of-the-head positioning element including axially aligned inner and outer tubular coupling pieces, the U-shaped back-of-the-head positioning element being designed to extend from a position adjacent the forehead of a golfer across the top of the head to a position overlying a portion of the rear of the head of the golfer, a U-shaped collar element including axially aligned inner and outer tubular coupling pieces, the U-shaped collar element being designed to extend from a position adjacent the forehead of the golfer around each side of the head with a free end positioned above each of the ears of the golfer, and a front padded head-positioning element including an inner tubular coupling piece, the front padded head-positioning element being designed to be positioned adjacent the forehead of the golfer. One of the inner tubular coupling piece of the U-shaped back-of-the-head positioning element is removably engaged in the outer tubular coupling piece of the horizontal arm and the inner tubular coupling element of the U-shaped collar element is removably engaged in the outer tubular coupling piece of the U-shaped back-of-the-head positioning element or the inner tubular coupling piece of the U-shaped collar element is removably engaged in the outer tubular coupling piece of the horizontal arm and the inner tubular coupling element of the U-shaped back-of-the-head positioning element is removably engaged in the outer tubular coupling piece of the U-shaped collar element, and the inner tubular coupling piece of the front padded head-positioning element is removably engaged in the outer tubular coupling piece of the U-shaped collar element or in the outer tubular coupling piece of the U-shaped back-of-the-head positioning element, respectively. A resilient spacer is affixed to each free end of the U-shaped collar element, at least a portion of the resilient spacers being positioned between the free ends and the golfer's head and one of the free ends of the U-shaped collar element is hingedly connected by a spring-loaded hinge to the U-shaped collar element so as to allow outward movement of the one free end away from the head of the golfer, the spring-loaded hinge biasing the one of the free ends into a closed position.

BRIEF DESCRIPTION OF THE DRAWINGS

The foregoing and further and more specific objects and advantages of the invention will become readily apparent to those skilled in the art from the following detailed description of a preferred embodiment thereof, taken in conjunction with the drawings in which:

FIG. 1 is a side view of a golf swing training device in use by a golfer;

FIG. 2 is a top view of the golf swing training device of FIG. 1;

FIGS. 13A through 13C are top views of a portion of the head engaging assembly of FIG. 5, illustrating three different adaptions of the portion.

DETAILED DESCRIPTION OF A PREFERRED EMBODIMENT

Figure 3:
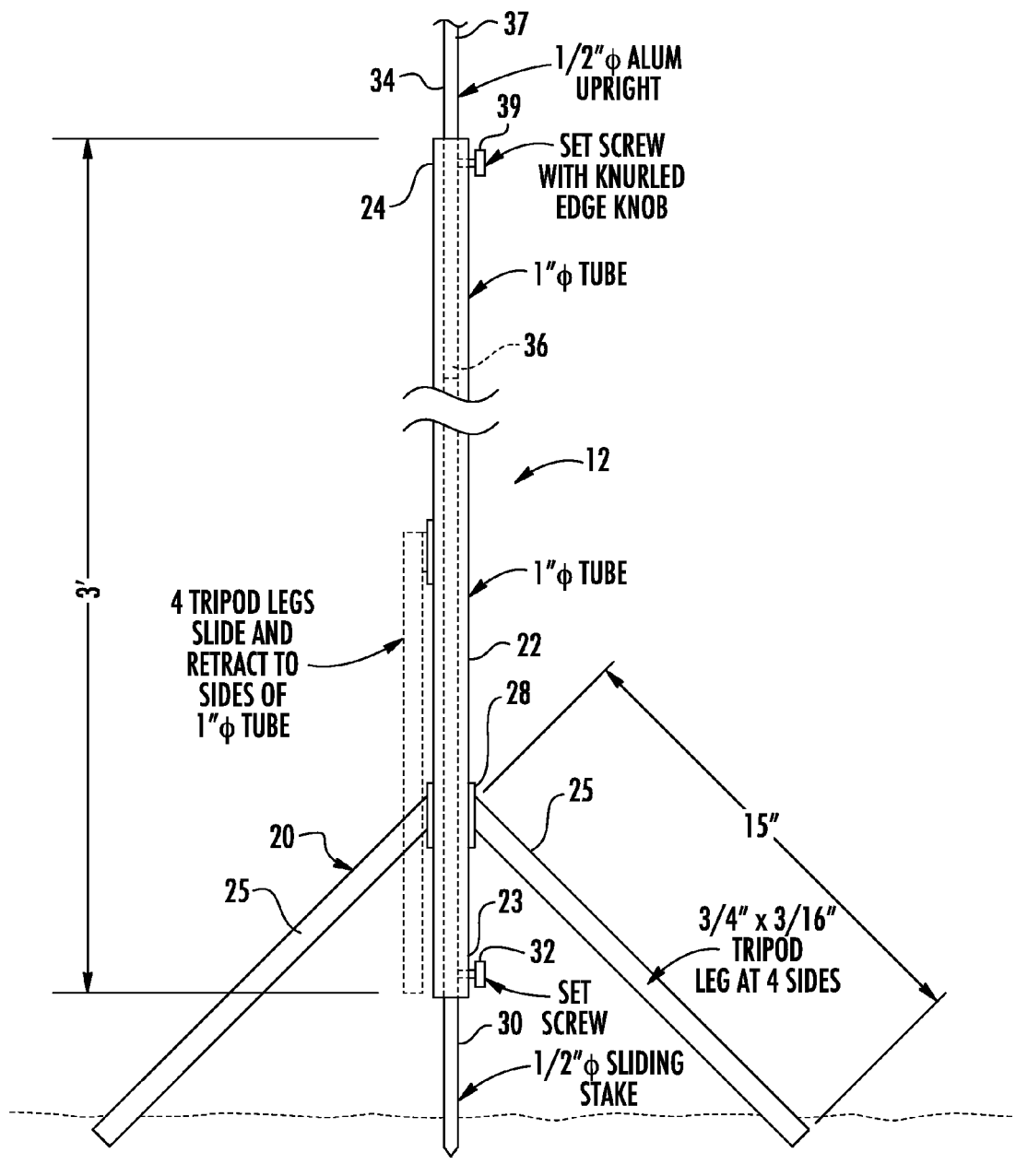
FIG. 3 is a side view of a tripod base of the golf swing training device of FIG. 1.

Turning now to the drawings in which like reference characters indicate corresponding elements throughout the several views, attention is directed to FIGS. 1 and 2 which illustrate a golf swing training device generally designated 10. Training device 10 includes a vertical support assembly 12, a horizontal arm 14 coupled to support assembly 12, and a head engaging assembly 15 carried by horizontal arm 14. Vertical support assembly 12 is positioned in front of a golfer 16 such that horizontal arm 14 positions head engaging assembly 15 over the golfer's head. Vertical support assembly 12 is of sufficient height that head engaging assembly 15 is at the appropriate height relative the golfer's swing position. Horizontal arm 14 is of sufficient length that head engaging assembly 15 is held at a sufficient distance from vertical support assembly 12 that a golfer 16 can complete a swing without interference therefrom.

With additional reference to FIG. 3, vertical support assembly 12 includes a tripod base 20 having an upright tubular member 22 with a lower end 23 and an upper end 24. Three or more legs 25 are hingedly coupled to a slide member 28 and movable between an extended position (forming a tripod) and a retracted position substantially parallel to upright tubular member 22. Slide member 28 moves reciprocally between a lowered position toward lower end 23 and a raised position toward upper end 24. In the lowered position, legs 25 are moved to the extended position to form a supporting tripod. In the raised position, legs 25 are moved to the retracted position as illustrated by broken lines. It will be understood that while three legs 25 are preferred, four or more may be employed.

An elongated stake element 30 is reciprocally carried within upright tubular member 22 at lower end 23 and adjustably extendable therefrom. Elongated stake element 30 is locked in position by a set screw 32 carried by upright tubular member 22 at lower end 23. Elongated stake element 30 can be extended from lower end 23 to provide an anchor for tripod base 20, providing additional stability in high winds and the like. Stake element 30 is driven into the ground, preventing tipping of vertical support assembly 12.

Figure 4:
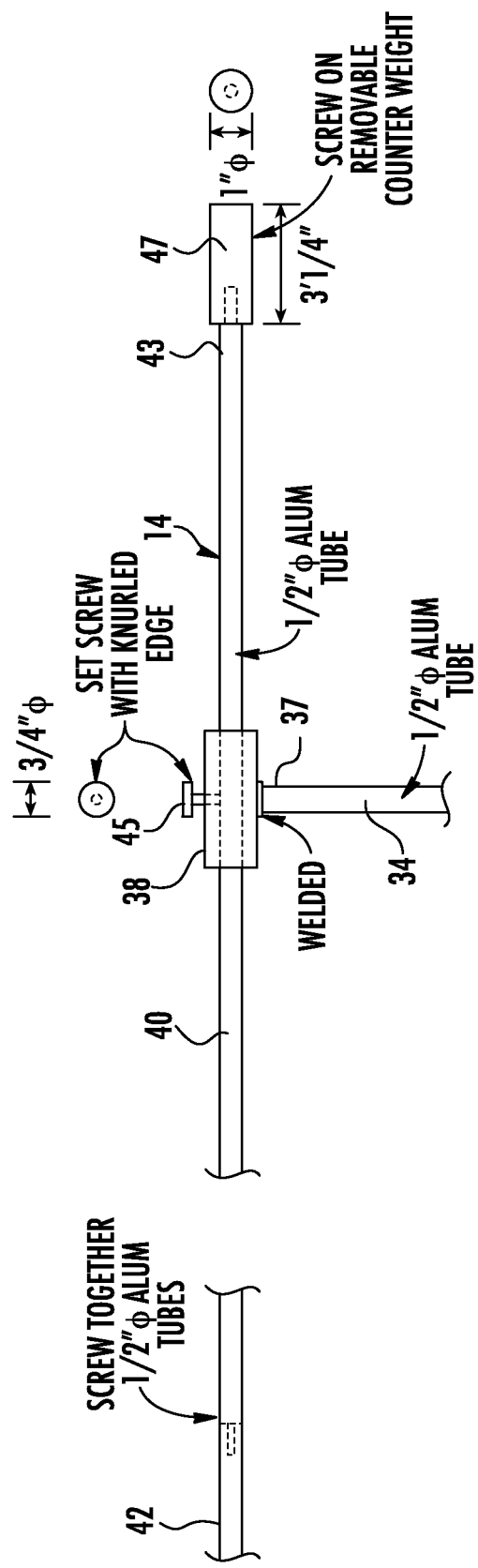
FIG. 4 is a side view of a horizontal arm of the golf swing training device of FIG. 1.

Still referring to FIG. 3, vertical support assembly 12 further includes a telescoping upright 34 reciprocally carried within upright tubular member 22 at upper end 24 and adjustably extendable therefrom. Telescoping upright 34 includes an end 36 received in upper end 24 and an end 37 terminating in a bracket 38 (FIG. 4). Bracket 38, in this embodiment is a tubular member receiving horizontal arm 14 therethrough. Telescoping upright 34 is locked in position by a locking mechanism such as a set screw 39. It will be understood that substantially any locking mechanism can be employed for this. Telescoping upright 34 can be extended from upper end 24 of upright tubular member 22 to provide selective adjustability for the height of horizontal arm 14.

With continued reference to FIGS. 1 and 2, and additional reference to FIG. 4, horizontal arm 14 includes an elongated rod 40 having a collar end 42 and a weight end 43. Elongated rod 40 is received through bracket 38, and fastened in position by a locking mechanism such as a set screw 45. Head engaging assembly 15 is coupled to collar end 42 and a counter weight 47 is coupled to weight end 43. Counter weight 47 is removable to permit removal of elongated rod 40 from bracket 38 for disassembly. The position of head engaging assembly 15 is adjustable by extending elongated rod from bracket 38 a greater or lesser distance.

Figure 5:
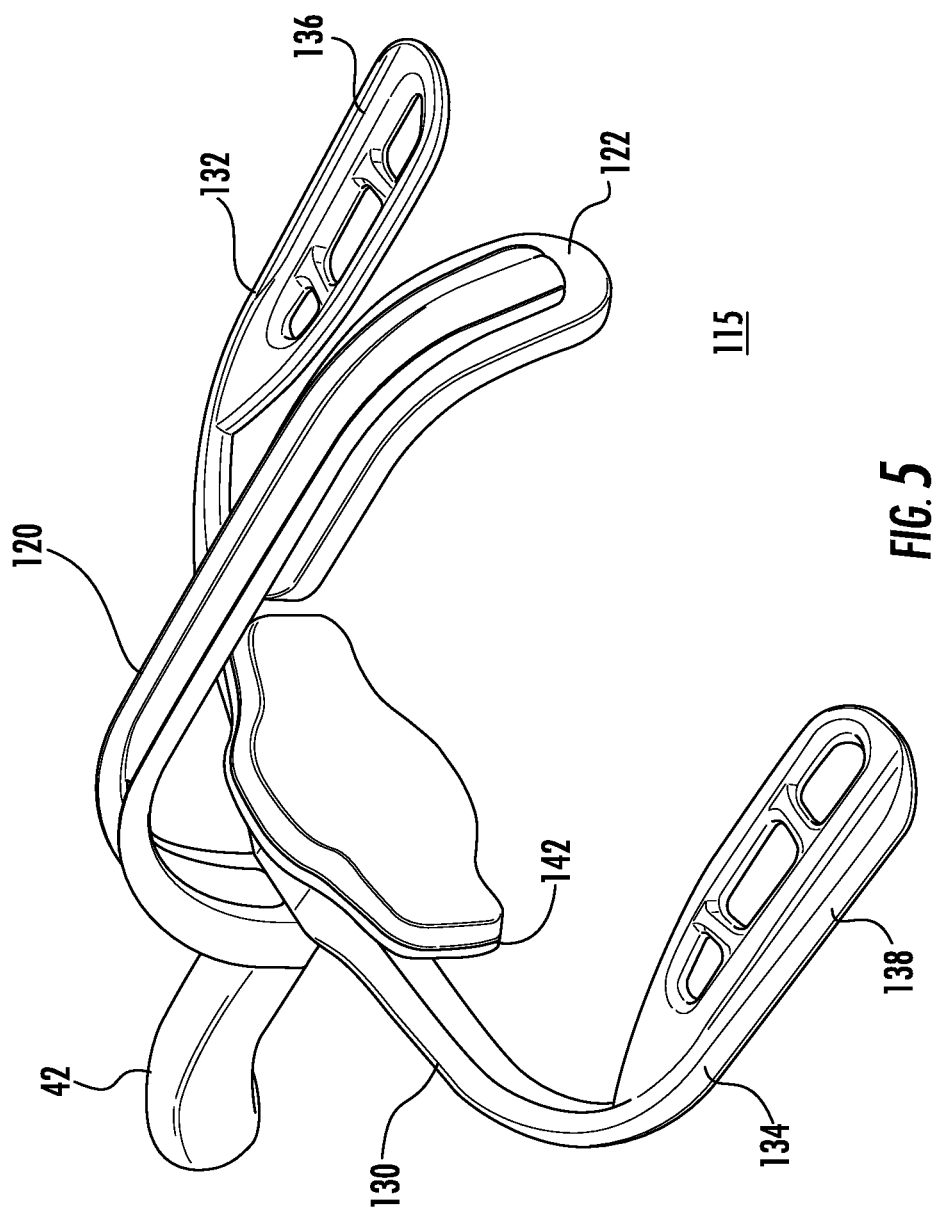
FIG. 5 is a rear view in perspective of a head engaging assembly, according to the present invention.
Figure 6:
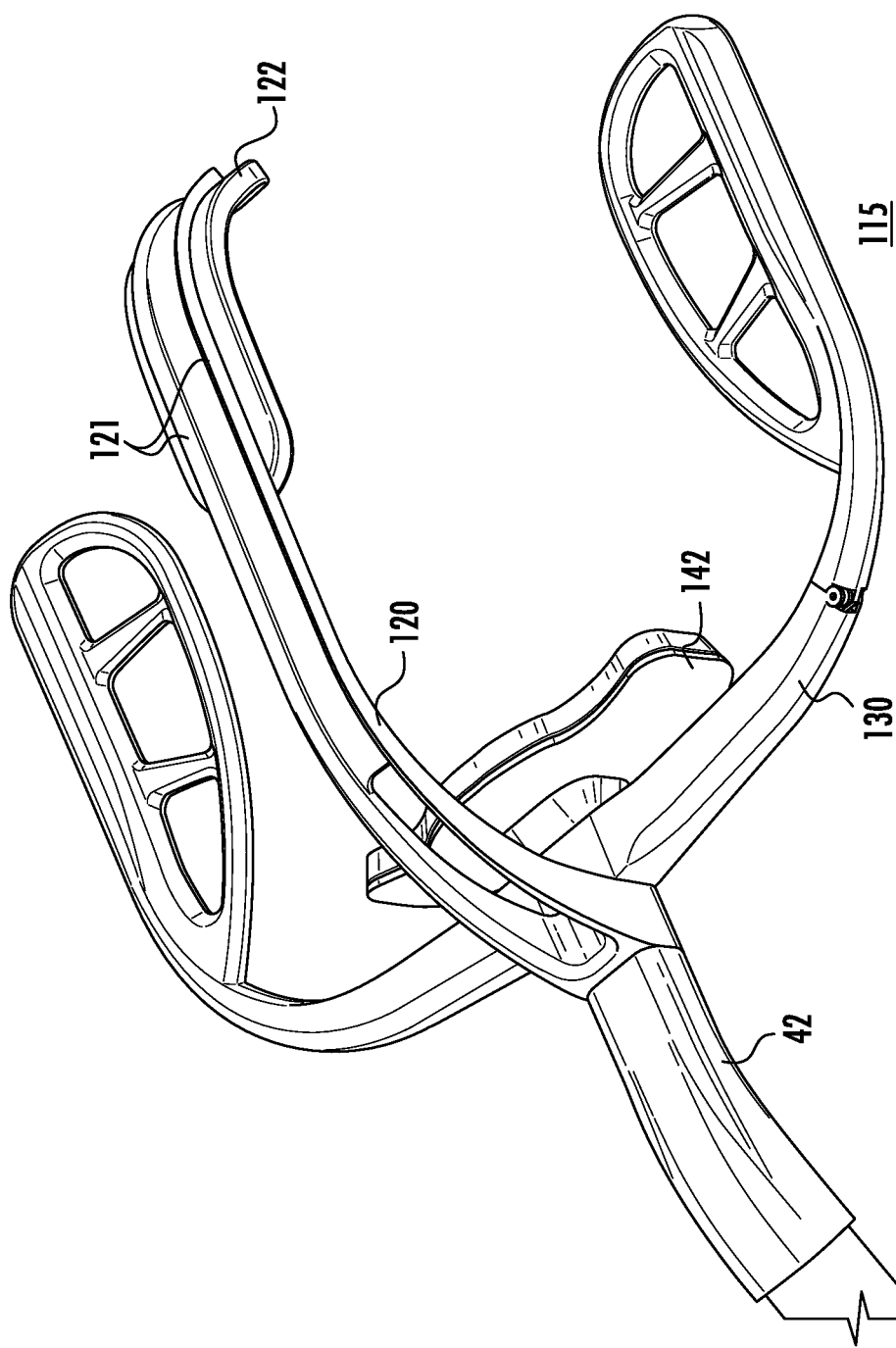
FIG. 6 is a front schematic view of the head engaging assembly of FIG. 5.
Figure 7:
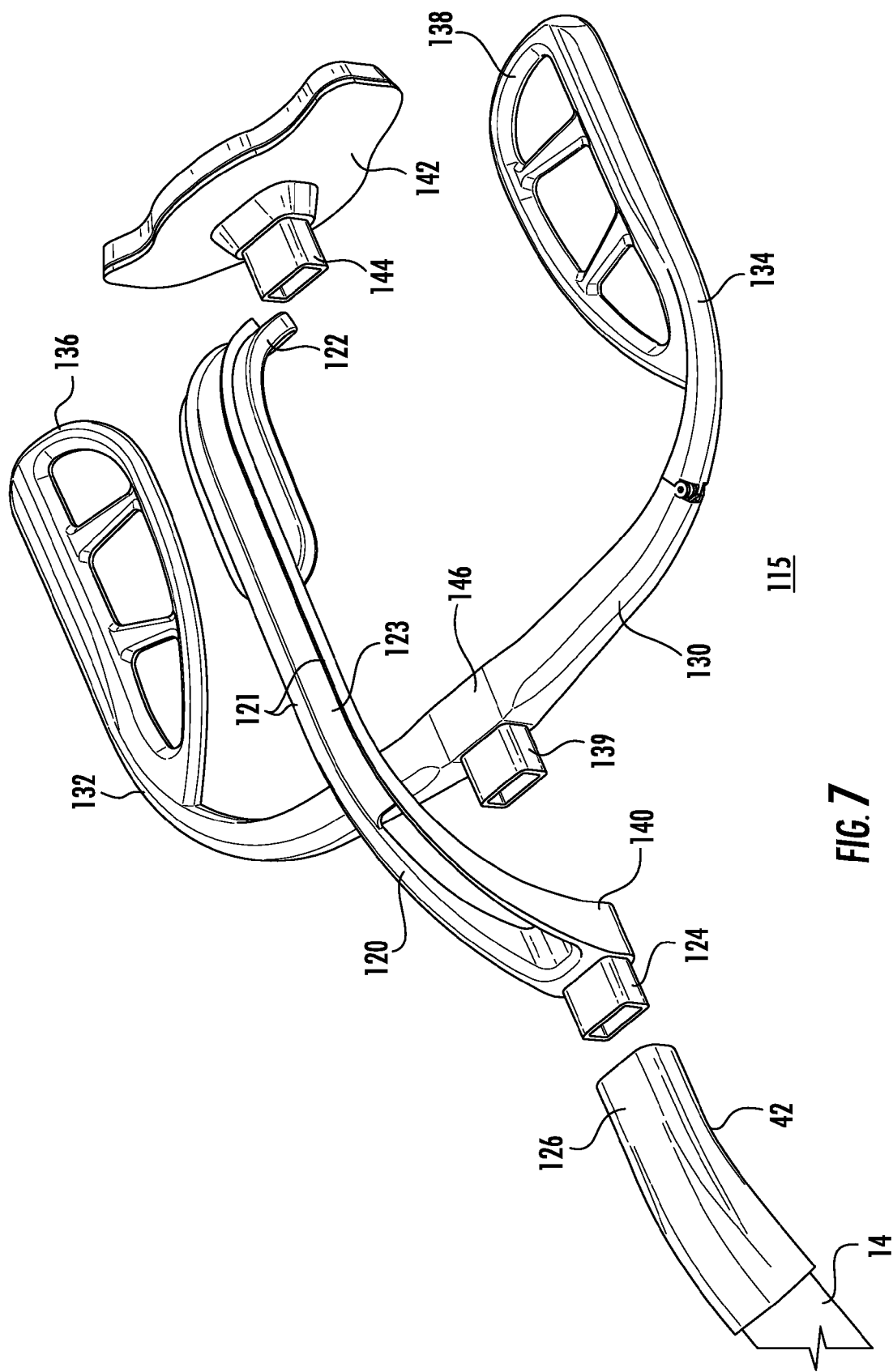
FIG. 7 is a top perspective exploded view of the head engaging assembly of FIG. 5.
Figure 8:
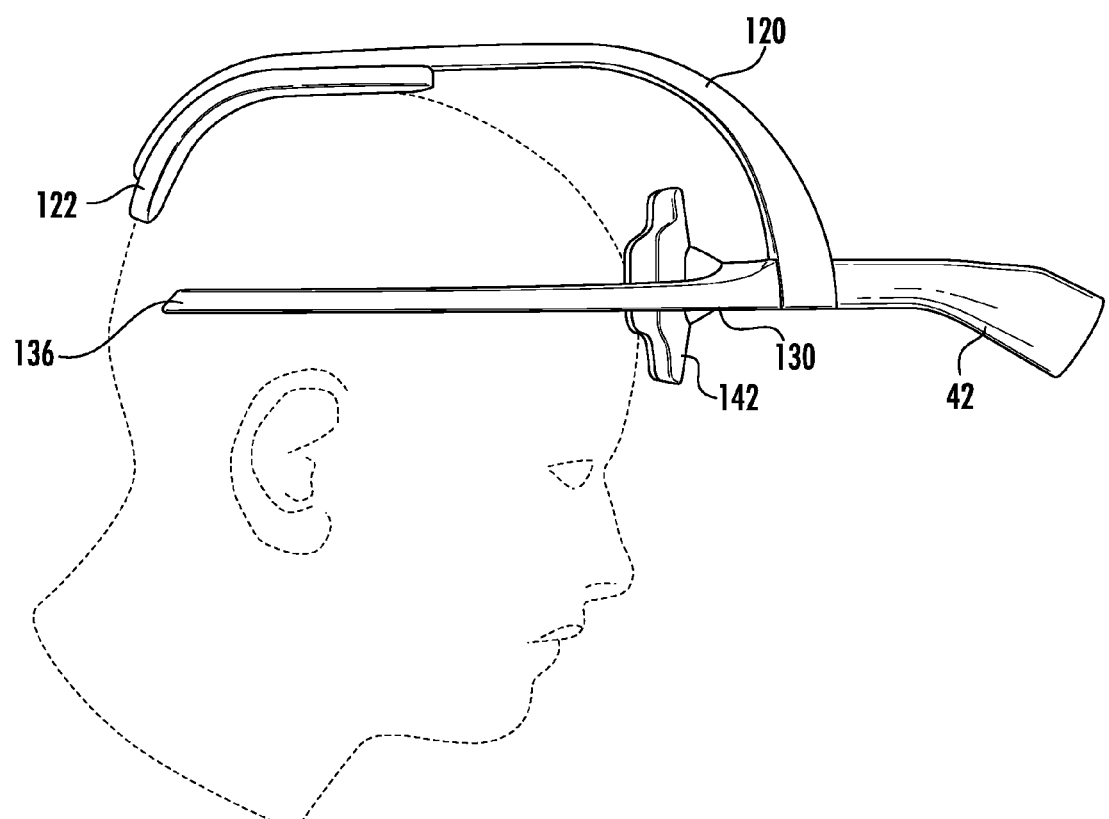
FIG. 8 is a side view of the head engaging assembly of FIG. 5, positioned on a golfer's head.
Figure 9:
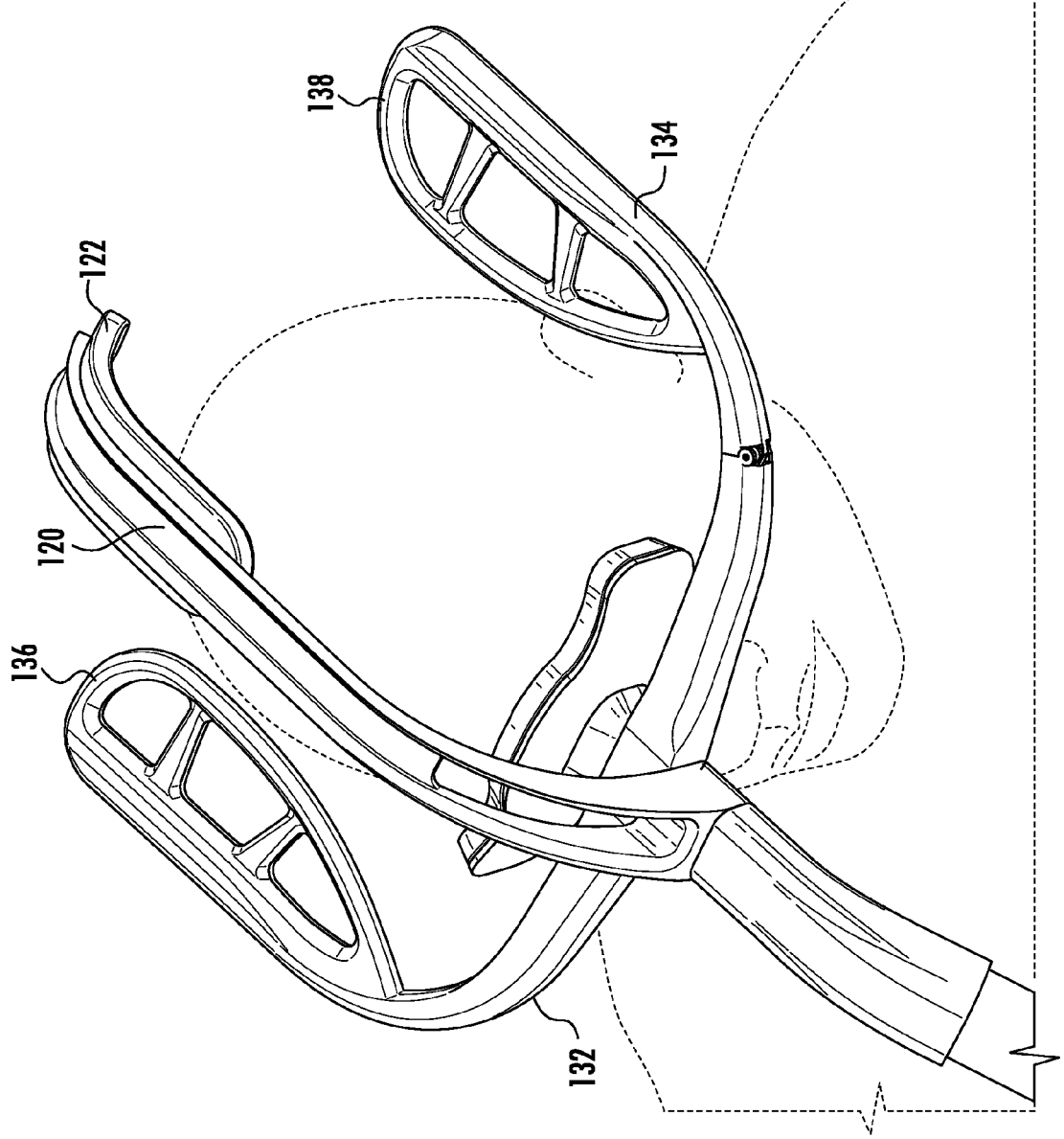
FIG. 9 is an enlarged top perspective view of the head engaging assembly of FIG. 5, positioned on a golfer's head.

Referring now to FIGS. 5, 6, and 7, a new and improved head engaging assembly 115 is illustrated. Head engaging assembly 115 includes an inverted U-shaped back-of-the-head positioning element 120 extending from collar end 42 of elongated rod 40 and sized to extend over the head of a golfer. A padded position indicator 122 is attached to the exterior end of element 120 and adapted to be positioned immediately adjacent or to loosely engage upper and rear portions of the golfer's head, as illustrated in FIGS. 8 and 9. In this embodiment, an inner tubular coupling piece 124 is formed on the front of U-shaped back-of-the-head positioning element 120 and a mating outer tubular coupling piece 126 is attached to the end of collar end 42 of elongated rod 40 (see FIG. 7). Inner and outer tubular coupling pieces 124 and 126 are designed to be frictionally engaged together for easy assembly and disassembly of head engaging assembly 115. In this specific example, each of the coupling pieces is formed of a thin walled material, such as metal or plastic, and should include a proper orientation configuration, in this example a generally rectangularly shaped tube but could be triangular, oval, or any other orienting configuration. It will be understood that other connecting pieces or components could be used but these are preferred because of the light weight and the proper orientation inherently involved.

A U-shaped collar element 130 is designed to extend around the front of a golfer's head from a free end 132 on the right-hand side to a free end 134 on the left-hand side. Soft rubber spacers 136 and 138 are constructed to slide into tracks or grooves in the free ends 132 and 134, respectively, so as to be positioned immediately adjacent or in loose contact with opposite sides of the golfer's head, as illustrated in FIGS. 8 and 9. While spacers 136 and 138 are designed to fit into tracks or grooves in this example, it will be understood that they could be formed as simple sleeves that are slideably engaged over ends 132 and 134. An inner tubular coupling piece 139 is formed on the front of U-shaped collar 130 and a mating outer tubular coupling piece 140 is formed in the U-shaped back-of-the-head positioning element 120 (see FIG. 7). Inner and outer tubular coupling pieces 139 and 140 are designed to be frictionally engaged together for easy assembly and disassembly of head engaging assembly 115.

In this preferred embodiment, inverted U-shaped back-of-the-head positioning element 120 and U-shaped collar 130 are formed of light, rigid metal or plastic and each include a single elongated member bent or formed into the desired shape. Flanges 121 extending along each edge of element 120 provide sufficient rigidity and a thin web 123 between flanges 121, with open spaces therein, provide an extremely light weight construction for element 120. Also, flanges extending longitudinally along element 130 form the tracks or grooves in the free ends 132 and 134.

A front padded head-positioning element 142 is positioned immediately adjacent or in loose contact with the front of the golfer's head (or forehead), as illustrated in FIGS. 8 and 9. An inner tubular coupling piece 144 is formed on the front of head-positioning element 142 and a mating outer tubular coupling piece 146 is formed in the U-shaped collar 130 (see FIG. 7). Inner and outer tubular coupling pieces 144 and 146 are designed to be frictionally engaged together for easy assembly and disassembly of head engaging assembly 115. It should be noted that all of inner and outer tubular coupling pieces 124 and 126, inner and outer tubular coupling pieces 139 and 140, and inner and outer tubular coupling pieces 144 and 146 are axially aligned to form a continuous joint between inverted U-shaped back-of-the-head positioning element 120, U-shaped collar 130, and front padded head-positioning element 142 for minimum used space and weight. Also, it should be understood that while U-shaped back-of-the-head positioning element 120 is engaged in collar end 42 of elongated rod 40 and U-shaped collar 130 is engaged in element 120, these elements could easily be reversed by simply engaging tubular coupling piece 139 in tubular coupling pieces 126 and engaging tubular coupling pieces 124 in tubular coupling pieces 146.

As illustrated in FIGS. 8 and 9, padded position indicator 122 of U-shaped back-of-the-head positioning element 120 and padded head-positioning element 142 cooperate to control upward as well as forward and backward movement of the golfer's head during the initial swing. Spacers 136 and 138 cooperate to control lateral movement of the golfer's head during the initial swing. It should be understood, that while the term "control" is used in connection with elements 120 and 130, spacers 136 and 138 and the golfer's head, this does not necessarily mean preventing any movement. Although this is possible, in this preferred embodiment it simply means a golfer will feel any movement through contact, and will have indication of improper movement.

It should also be noted that spacers 136 and 138 are preferably constructed of soft rubber with an open-grid design to ensure positive contact with a minimum of pressure or force when or if contact occurs. While soft rubber is preferred for spacers 136 and 138 and for padded position indicator 122 and padded head-positioning element 142 it should be understood that any soft resilient material could be used including but not limited to some plastics, cloth or other organic material, etc.

Figure 10:
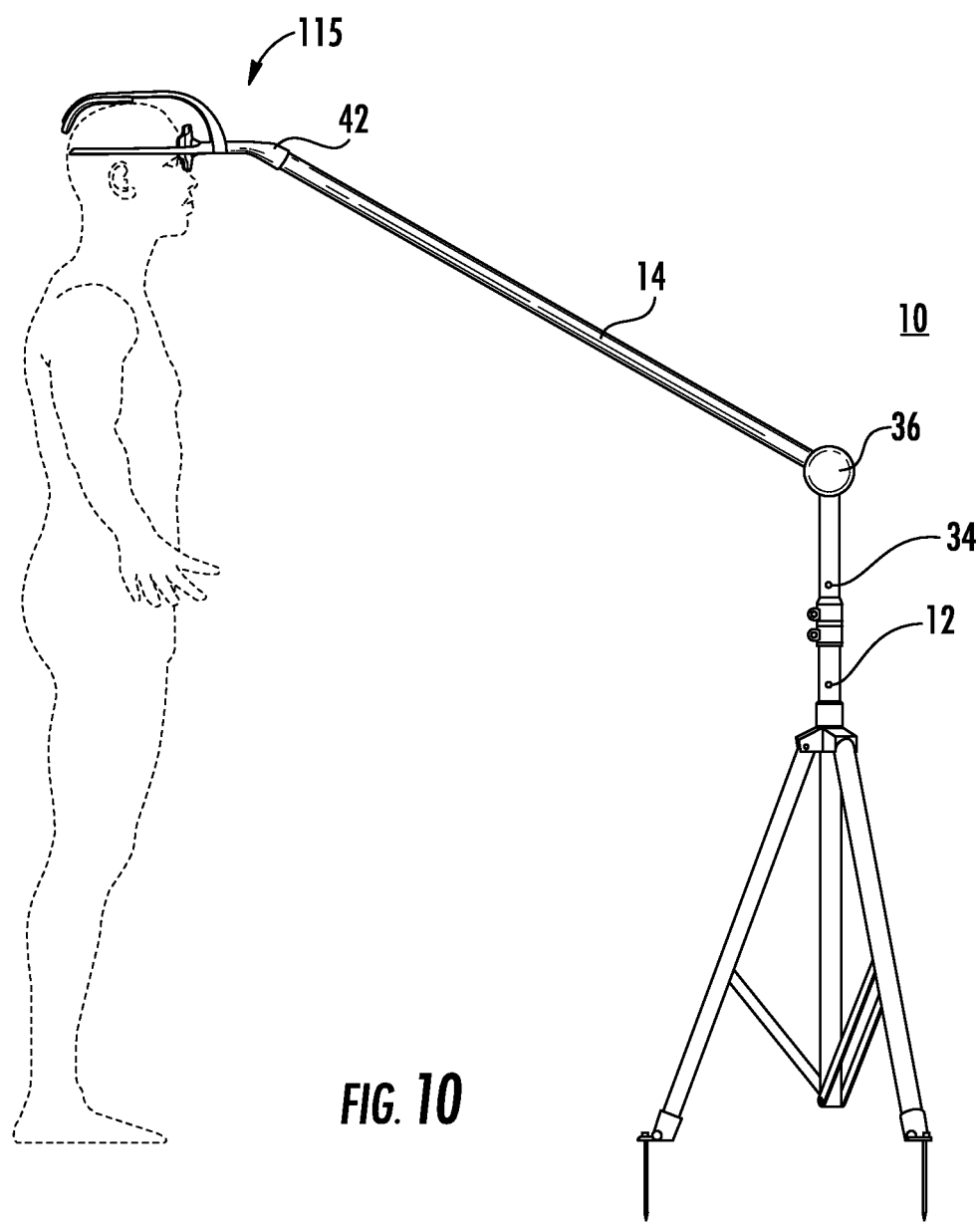
FIG. 10 is a side view of the head engaging assembly of FIG. 5 attached to a golf swing training device and positioned on a golfer's head.

Referring to FIG. 10, a somewhat different vertical support assembly 12 and horizontal arm 14 for training device 10 are illustrated. In this example, telescoping upright 34 includes an end 36 which is constructed to receive one end of horizontal arm 14 therein with collar end 42 frictionally engaged to the other end. As illustrated additionally in FIG. 7, outer tubular coupling piece 126 is attached to collar end 42 and head engaging assembly 115 attaches as described above. It can be seen that by simply adjusting telescoping upright 34, training device 10 can be quickly and easily adjusted to fit any practicing golfer.

Figure 11:
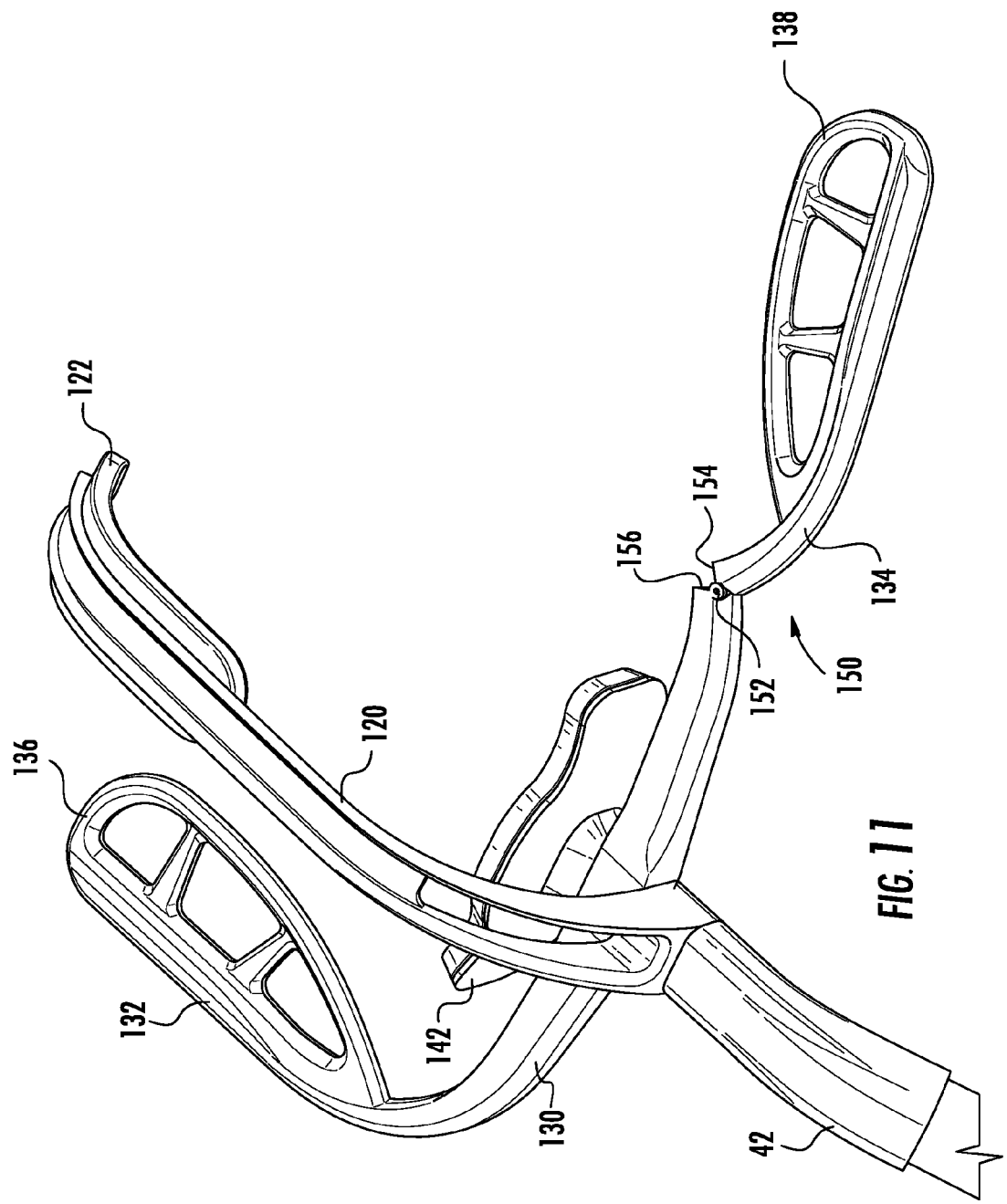
FIG. 11 is a top perspective view of the head engaging assembly of FIG. 5, illustrating the head release feature for the follow through motion of a proper golf swing.
Figure 12:
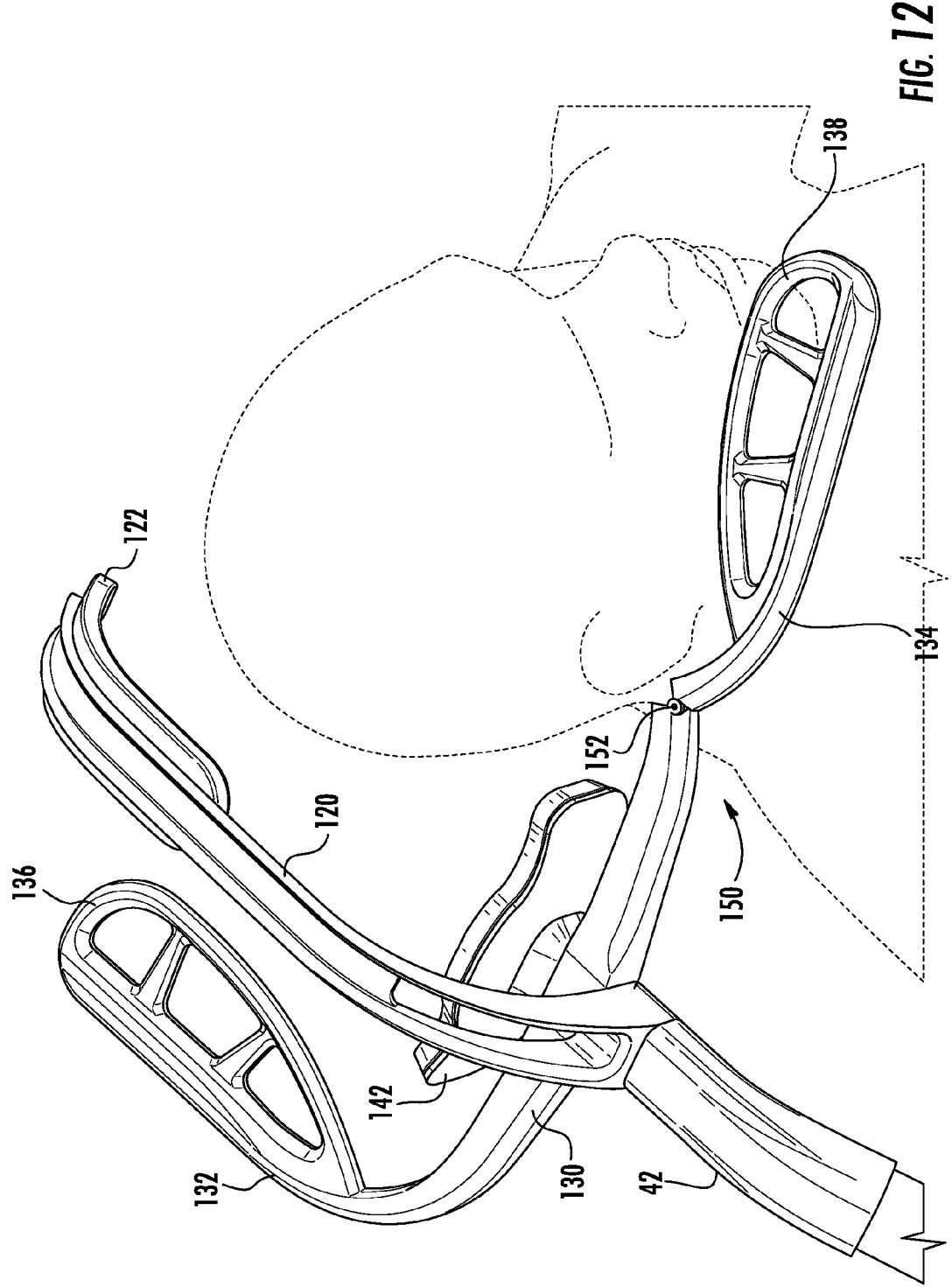
FIG. 12 is an enlarged top perspective view of the head engaging assembly of FIG. 5 positioned on a golfer's head, illustrating the head release feature during release.

Turning now to FIGS. 11 and 12, a hinged portion 150 of U-shaped collar 130, in this example, is provided in the left arm. To accommodate both left and right handed golfers, U-shaped collar 130 can be inverted, or the right arm can also be terminated in a hinged portion. In the example illustrated in FIGS. 11 and 12, the end 134 of U-shaped collar 130 is attached by a spring loaded hinge 152 mounted to be housed within the junction between the end 134 and the body of U-shaped collar 130. Spring loaded hinge 152 is designed to bias end 134 of U-shaped collar 130 into a closed position (illustrated in FIG. 6). Also, to aid in retaining end 134 in the closed position, one or more magnets may optionally be mounted in the abutting surfaces 154 and 156 of end 134 and U-shaped collar 130, respectively. Thus, hinged portion 150 has no sharp edges or protrusions that can catch clothing or cause injury during use.

In operation, end 134 is free to pivot outwardly, away from abutting surface 156 of U-shaped collar 130 in the direction illustrated in FIGS. 11 and 12, from a closed position to the open position illustrated. Thus, after the initial golf swing, as the golfer shifts forwardly, his head contacts spacer 138 in the closed position which is pivoted outwardly to the open position, out of the way to allow the weight shift. Further, after a swing, as a golfer's weight is shifted forwardly, and end 134 moves to the open position, U-shaped back-of-the-head positioning element 120 is no longer directly above the golfer's head (because of the head movement, see FIG. 12), allowing a forward and upward movement of the golfer's head at the end of the swing follow through.

Turning to FIGS. 13A, 13B, and 13C, an additional feature of the easily modified modular construction of the improved head engaging assembly 115 is illustrated. It is understood by those of skill in the art that there is a difference in the amount of movement between beginners and experts. In fact, a major purpose of improved head engaging assembly 115 is to aid golfers in improving their stance/swing and reducing head movement. As explained above, soft rubber spacers 136 and 138 are constructed to slide into tracks or grooves in the free ends 132 and 134, respectively, of U-shaped collar 130. Referring specifically to FIG. 13A, U-shaped collar 130 has modified spacers 160 and 162 attached to ends 132 and 134, respectively. Modified spacers 160 and 162 may be simply soft rubber extension or they could be spacers 136 and 138 positioned in a turned-down orientation. In either case, modified spacers 160 and 162 provide more room for the golfer to move their head, as for example with beginners. Referring specifically to FIG. 13B, a pair of modified spacers 164 and 166 are turned at a slightly different angel (e.g. 45 degrees) to reduce the amount of head movement that is allowed before contact occurs. This might be for example a pro setting. Referring specifically to FIG. 13C, spacers 136 and 138 are illustrated (e.g. turned at 90 degrees) to further reduce the amount of head movement that is allowed before contact occurs. This might be for example an expert setting. While three different examples are illustrated, it will be understood that many more modifications might be provided to help golfers improve in steps or virtually continuously.

Thus a modular head engaging assembly for use with a golf swing training device is disclosed which will release the golfer's head for the follow through motion of a proper golf swing. Also, the head engaging assembly is constructed in a modular configuration so that any of the components may be easily changed to fit any of various golfers. Further, the head engaging assembly is light weight and easily attached to the golf swing training device.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. A modular head engaging assembly for use with a golf swing training device having a horizontal arm coupled to a vertical support assembly, the horizontal arm having an outer tubular coupling piece attached thereto, the modular head engaging assembly comprising:
   a U-shaped back-of-the-head positioning element including axially aligned inner and outer coupling pieces, the U-shaped back-of-the-head positioning element being designed to extend from a position adjacent the forehead of a golfer across the top of the head to a position overlying a portion of the rear of the head of the golfer;
   a U-shaped collar element including axially aligned inner and outer coupling pieces, the U-shaped collar element being designed to extend from a position adjacent the forehead of the golfer around each side of the head with a free end positioned above each of the ears of the golfer;
   a front head-positioning element including an inner coupling piece, the front head-positioning element being designed to be positioned adjacent the forehead of the golfer; and
   one of the inner coupling piece of the U-shaped back-of-the-head positioning element being removably engaged in the outer coupling piece of the horizontal arm and the inner coupling element of the U-shaped collar element being removably engaged in the outer coupling piece of the U-shaped back-of-the-head positioning element or the inner coupling piece of the U-shaped collar element being removably engaged in the outer coupling piece of the horizontal arm and the inner coupling element of the U-shaped back-of-the-head positioning element being removably engaged in the outer coupling piece of the U-shaped collar element, and the inner coupling piece of the front head-positioning element being removably engaged in the outer coupling piece of the U-shaped collar element or in the outer coupling piece of the U-shaped back-of-the-head positioning element, respectively.

2. A modular head engaging assembly as claimed in claim 1 further including a resilient spacer affixed to each free end of the U-shaped collar element, at least a portion of the resilient spacers being positioned between the free ends and the golfer's head.

3. A modular head engaging assembly as claimed in claim 2 wherein the resilient spacers are formed with an open-grid design.

4. A modular head engaging assembly as claimed in claim 3 wherein the resilient spacers are formed of soft rubber.

5. A modular head engaging assembly as claimed in claim 1 wherein one of the free ends of the U-shaped collar element is hingedly connected to the U-shaped collar element so as to allow outward movement of the one free end away from the head of the golfer.

6. A modular head engaging assembly as claimed in claim 5 wherein the one of the free ends of the U-shaped collar element is hingedly connected to the U-shaped collar element by a spring-loaded hinge.

7. A modular head engaging assembly as claimed in claim 6 wherein the spring loaded hinge is housed within the junction between the one of the free ends of the U-shaped collar element and the body of U-shaped collar element, the spring-loaded hinge biasing the one of the free ends into a closed position.

8. A modular head engaging assembly as claimed in claim 7 and further including magnets mounted in the junction between the one of the free ends of the U-shaped collar element and the body of U-shaped collar element to further bias the one of the free ends into a closed position.

9. A modular head engaging assembly as claimed in claim 1 wherein the U-shaped back-of-the-head positioning element and the U-shaped collar element are formed of light, rigid metal or plastic and each include a single elongated member bent or formed into the desired shape.

10. A modular head engaging assembly for use with a golf swing training device having a horizontal arm coupled to a vertical support assembly, the horizontal arm having an outer coupling piece attached thereto, the modular head engaging assembly comprising:
a U-shaped back-of-the-head positioning element including axially aligned inner and outer coupling pieces, the U-shaped back-of-the-head positioning element being designed to extend from a position adjacent the forehead of a golfer across the top of the head to a position overlying a portion of the rear of the head of the golfer;
a U-shaped collar element including axially aligned inner and outer coupling pieces, the U-shaped collar element being designed to extend from a position adjacent the forehead of the golfer around each side of the head with a free end positioned above each of the ears of the golfer;
a front head-positioning element including an inner coupling piece, the front head-positioning element being designed to be positioned adjacent the forehead of the golfer;
one of the inner tubular coupling piece of the U-shaped back-of-the-head positioning element being removably engaged in the outer coupling piece of the horizontal arm and the inner coupling element of the U-shaped collar element being removably engaged in the outer coupling piece of the U-shaped back-of-the-head positioning element or the inner coupling piece of the U-shaped collar element being removably engaged in the outer coupling piece of the horizontal arm and the inner coupling element of the U-shaped back-of-the-head positioning element being removably engaged in the outer coupling piece of the U-shaped collar element, and the inner coupling piece of the front head-positioning element being removably engaged in the outer coupling piece of the U-shaped collar element or in the outer coupling piece of the U-shaped back-of-the-head positioning element, respectively;
a resilient spacer affixed to each free end of the U-shaped collar element, at least a portion of the resilient spacers being positioned between the free ends and the golfer's head; and
one of the free ends of the U-shaped collar element being hingedly connected by a spring-loaded hinge to the U-shaped collar element so as to allow outward movement of the one free end away from the head of the golfer, the spring-loaded hinge biasing the one of the free ends into a closed position.

11. A golf swing training device comprising:
a vertical support assembly;
a horizontal arm coupled to the vertical support assembly;
a head engaging assembly carried by the horizontal arm, the head engaging assembly comprising:
a U-shaped back-of-the-head positioning element including axially aligned inner and outer coupling pieces, the U-shaped back-of-the-head positioning element being designed to extend from a position adjacent the forehead of a golfer across the top of the head to a position overlying a portion of the rear of the head of the golfer;
a U-shaped collar element including axially aligned inner and outer coupling pieces, the U-shaped collar element being designed to extend from a position adjacent the forehead of the golfer around each side of the head with a free end positioned above each of the ears of the golfer;
a front head-positioning element including an inner coupling piece, the front head-positioning element being designed to be positioned adjacent the forehead of the golfer;
one of the inner coupling piece of the U-shaped back-of-the-head positioning element being removably engaged in the outer coupling piece of the horizontal arm and the inner coupling element of the U-shaped collar element being removably engaged in the outer coupling piece of the U-shaped back-of-the-head positioning element or the inner coupling piece of the U-shaped collar element being removably engaged in the outer coupling piece of the horizontal arm and the inner coupling element of the U-shaped back-of-the-head positioning element being removably engaged in the outer coupling piece of the U-shaped collar element, and the inner coupling piece of the front head-positioning element being removably engaged in the outer coupling piece of the U-shaped collar element or in the outer coupling piece of the U-shaped back-of-the-head positioning element, respectively;
a resilient spacer affixed to each free end of the U-shaped collar element, at least a portion of the resilient spacers being positioned between the free ends and the golfer's head; and
one of the free ends of the U-shaped collar element being hingedly connected by a spring-loaded hinge to the U-shaped collar element so as to allow outward movement of the one free end away from the head of the golfer, the spring-loaded hinge biasing the one of the free ends into a closed position.

12. A golf swing training device as claimed in claim 11 wherein the vertical support assembly is adjustable to provide height adjustment for the horizontal arm, and coincidentally the head engaging assembly.

13. A golf swing training device as claimed in claim 11 wherein the horizontal arm is adjustable relative to the vertical support assembly to provide adjustability for the positioning of the head engaging assembly relative the vertical support assembly.

14. A golf swing training device as claimed in claim 11 wherein the vertical support assembly comprises:
a base having an upright tubular member with a lower end and an upper end, at least three legs extend from the lower end;

a telescoping upright reciprocally carried within the upright tubular member at the upper end, and adjustably extendable therefrom, the telescoping upright terminating in a bracket for receiving the horizontal arm.

15. A golf swing training device as claimed in claim 14 wherein the at least three legs are hingedly coupled to the upright tubular member and movable between an extended position and a retracted position.

16. A golf swing training device as claimed in claim 15 wherein the at least three legs are hingedly coupled to the upright tubular member by a slide member reciprocally movable between a lowered position toward the lower end and a raised position toward the upper end.

17. A golf swing training device as claimed in claim 14 wherein an elongated stake element is reciprocally carried within the upright tubular member at the lower end and adjustably extendable therefrom.

\* \* \* \* \*